No. 815,800. PATENTED MAR. 20, 1906.
J. T. DEMPSTER.
FLICKER PHOTOMETER.
APPLICATION FILED AUG. 22, 1904.

2 SHEETS—SHEET 2.

WITNESSES:
George A. Thornton
Hreen Oxford

INVENTOR
John T. Dempster,
By Albert G. Davis
Atty.

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

FLICKER-PHOTOMETER.

No. 815,800.  Specification of Letters Patent.  Patented March 20, 1906.

Application filed August 22, 1904. Serial No. 221,668.

*To all whom it may concern:*

Be it known that I, JOHN THOS. DEMPSTER, a subject of the King of Great Britain, residing at Schenectady, county of Schenectady, State of New York, have invented certain new and useful Improvements in Flicker-Photometers, of which the following is a specification.

Photometric comparisons of light sources are often rendered inconvenient and inaccurate because of the difference in color between the lights compared. Thus in comparing an arc-lamp with an incandescent standard by means of a Bunsen or grease-spot photometer the difference in color between the two lights makes it practically impossible to determine a setting of the photometer on the photometer-bar which will make the contrasted surfaces of the photometer-screen appear equally illuminated. In such cases the operator must depend to a large extent upon his experience and judgment in the comparison of light intensities, and since the contrast in color affects different observers in different degrees the photometric results obtained by such a comparison are often unreliable.

The object of the present invention is to provide a means for readily and accurately comparing light sources irrespective of the color of the light. The photometer described herein embodies the principle, well known in optics, that if the human eye is alternately subjected to light from two sources, the exposures following each other in rapid succession, the eye will experience a peculiar flickering sensation. This sensation is probably due to the reflex action of the nerves of the eye in attempting to adjust the focus of the eye to correspond with the intensity of the light received; but if the two light sources are gradually brought to the same intensity the flickering sensation gradually disappears. This flicker is dependent entirely upon the intensity of the light and appears to be uninfluenced by the color of the light transmitted to the eye, so that a photometer embodying this principle may be used for a comparison of lights radically different in color, as well as for lights of the same quality.

The invention will be readily understood by reference to the following description, taken in connection with the drawings forming a part of this specification, in which—

Figure 1:
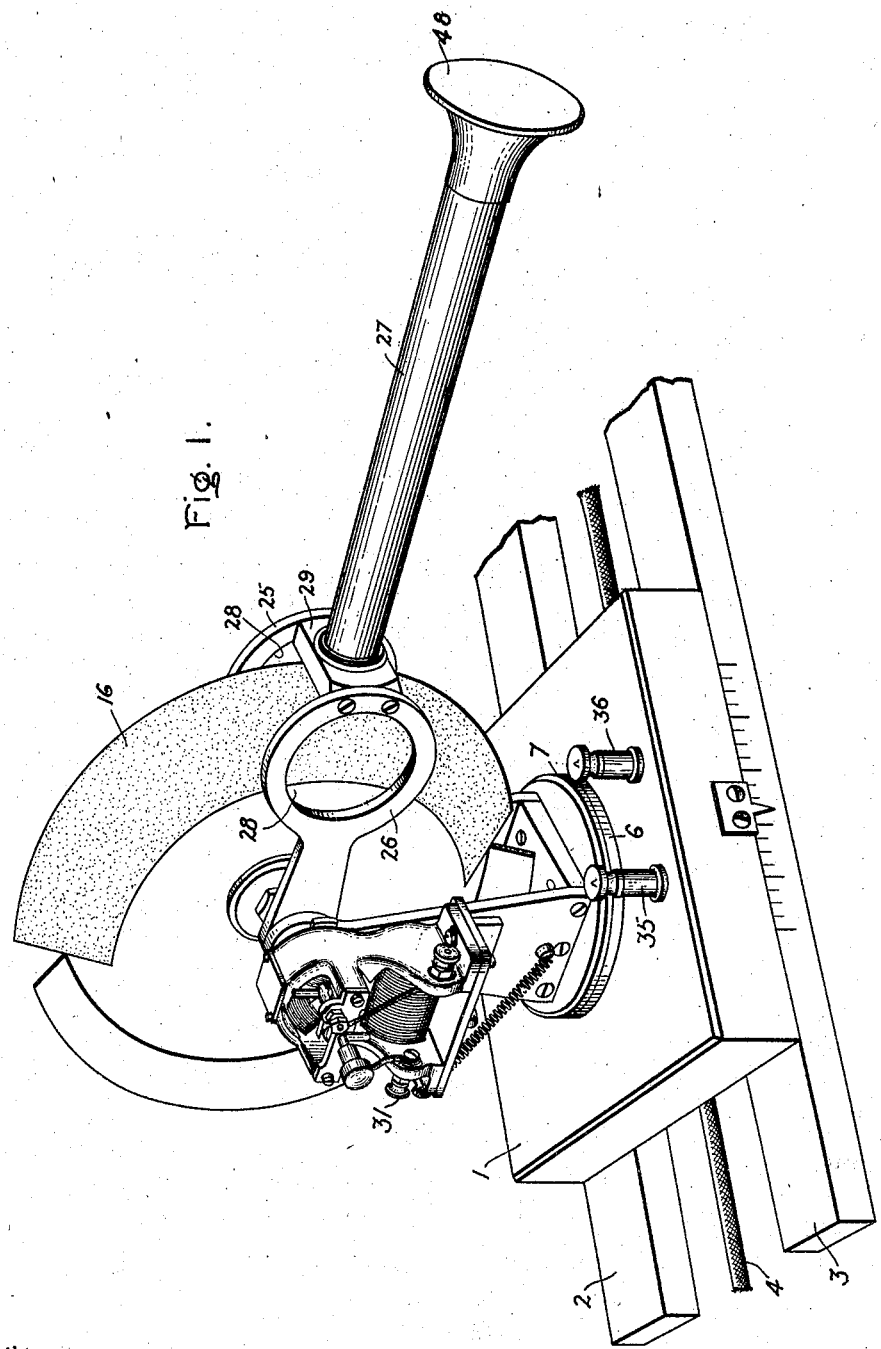
Figure 2:
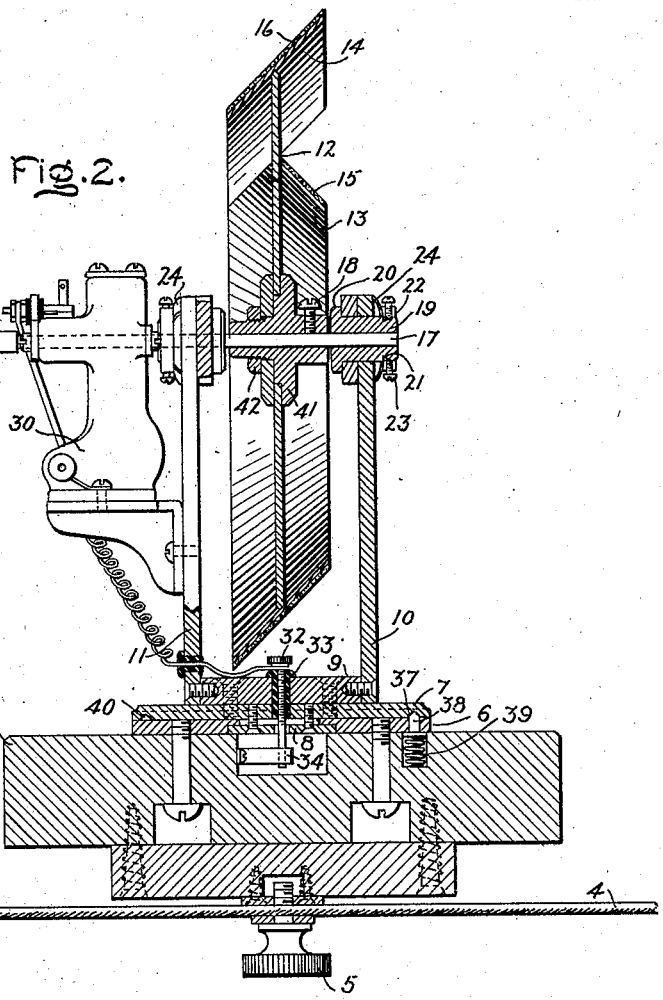
Figure 3:
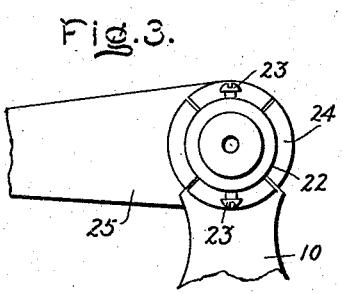

Figure 1 is a perspective view of the photometer with the movable parts rotated through a slight angle about a vertical axis for convenience of illustration. Fig. 2 is a side elevation, partly in section; and Fig. 3 is a detail of the novel form of friction-bearing used in supporting the sight-tube yoke to the vertical standards.

The base-block 1 is adapted to support the photometer on the guide-bars 2 and 3 and may be adjusted longitudinally thereon by the rope 4, clamped to the base by set-screw 5. Rigidly screwed to the block 1 is a base-plate 6, on which rests the top plate 7. An annular plate 8, rigidly connected to the top plate 7, engages a groove in the lower surface of plate 6, so that the top plate 7 and the parts carried thereby may be freely rotated about a vertical axis. Screwed to the top of plate 7 is the plate 9, which serves to support the two standards 10 and 11, these standards serving to support the photometric disk and its driving-motor. The photometric disk comprises a central web 12, on the periphery of which are secured two frusto-conical surfaces 13 and 14. Each of these surfaces occupies one-half the periphery of the web 12, and the elements of the surface make an angle of forty-five degrees with the central horizontal axis of the disk. These surfaces serve as reflectors in a manner hereinafter described and have a uniform mat-surface. This may be obtained in many ways; but I prefer to make use of white blotting-paper cut in strips 15 16 to conform to the surfaces 13 and 14 and glued thereto. The web 12 is rigidly clamped to the hub 41 by the nut 42, the whole being clamped to the shaft 17 by set-screw 18. The shaft 17 is supported in standards 10 and 11 by a bearing of novel construction comprising a cylindrical hub 19, having an annular flange 20 on its inner edge and a groove 21 near its outer edge, the bottom of said groove having a sloped surface.

An annular ring 22 is adjustably secured near the outer end of the collar by set-screws 23, the inner ends of the set-screws engaging with the sloped surface of the groove, so that by tightening the set-screws the ring may be forced longitudinally on the collar. A concave slotted washer 24 is pressed by ring 22 against the standard 10. By the means described the arms 25 and 26 of the sight-tube yoke are clamped securely to the standards 10 and 11; but at the same time the securing means is sufficiently resilient to permit rotation of the sight-tube 27 about a horizontal axis coincident with the shaft 17. Circular openings 28 are provided in the yoke-arms 25 and 26 to permit the passage of the light from the sources to be compared to the photometric disk, from which it is reflected through the sight-tube 27 to the eye of the operator at the eyepiece 48. As the reflecting-surfaces are symmetrically arranged on the rotating member, the length of the reflected ray is constant. The light-tube 27 is screw-threaded in the cross-bar 29 of the yoke for convenience in packing for shipment. The driving-motor 30 may be of any convenient type and is direct-connected to the shaft 17 of the photometer-disk. To secure freedom of rotation of the standards 10 and 11 about a vertical axis through the center of base-plate 6, a special arrangement of the motor connections is necessary. The terminal 31 is connected by an insulated conductor to the brass stud 32, which passes down through an annular insulating-plug 33 to a small cavity in the block 1, in which is located contact-brush 34, said brush being electrically connected with binding-post 35. The other terminal of the motor is grounded directly to the motor-frame, the frame being connected with binding-post 36. In order that sight-tube 27 may be at exactly right angles to the photometer-bar when readings are being taken, the top plate 7 is provided with a small conical depression 37 on its under surface, into which fits a plunger 38, adjustably supported by coil-spring 39, contained in a recess in the base-block 1. The top plate 7 is provided with a second conical depression 40, located diametrically opposite the depression 37, so that when the sight-tube 27 is rotated through one hundred and eighty degrees it will still have the proper angular relation with the photometer-bar.

The operation of the device is as follows: The two lights to be compared are placed at the opposite ends of the photometer-bar in the ordinary manner, and the rotatable disk of the photometer is set in motion by its driving-motor. The speed of the disk appears to have little influence on the accuracy of the measurements within wide limits; but two hundred revolutions per minute gives good results. The light from the two sources passes through the openings in the yoke-arms 25 and 26 and encounters the rotating disk, from which the light from one source is reflected through the sight-tube 27 to the eye of the observer, while the light from the other source is reflected back at an angle to the photometer-bar and does not enter the sight-tube at all. At each half-revolution of the disk a new reflector-surface comes before the end of the sight-tube, thus alternately presenting to the eye of the observer the reflected light from the two sources. As the change from one source to the other is exceedingly abrupt because of the shape of the conical reflector-surfaces and because of the way in which they are mounted on the web 12, the effect on the eye will likewise be abrupt, and any inequality in intensity may be readily detected by the flickering sensation produced. To determine the candle-power of the light, the photometer is adjusted along the bar until the flicker entirely disappears. The location of the photometer then indicates the point of equal intensity of illumination, and the calculations of candle-power may be made by the ordinary method. To compensate for any irregularity in the reflecting-surfaces 15 16, the top plate 7, together with the parts supported thereby, is rotated through an angle of one hundred and eighty degrees, thereby presenting the reverse side of the revolving disk to the standard light and changing the sight-tube 27 to the opposite side of the photometer-bar.

In order that all readings may be taken from the same side of the bar, the sight-tube is then rotated through one hundred and eighty degrees about the shaft 17, thus bringing it to its original position to the front of the photometer-bar, in which position a second reading is taken. The friction between the yoke-arms 25 and 26 and the standards 10 and 11 while sufficient to support the sight-tube 27 in a horizontal position will nevertheless permit this movement of the yoke.

With the exception of the reflecting-surfaces 15 16 all the parts are finished in dull black, so that stray light will not in any way influence the accuracy of the readings.

What I claim as new, and desire to secure by Letters Patent of the United States, is—

1. A flicker-photometer having a plurality of movable light-reflecting surfaces, and means for successively viewing said reflecting-surfaces.

2. A flicker-photometer having a rotatable member, a plurality of light-reflecting surfaces carried thereby, and means for successively viewing said reflecting-surfaces.

3. A flicker-photometer having an eyepiece, a plurality of light-reflecting surfaces for reflecting light from different sources to said eyepiece, and means for successively moving said surfaces to positions equidistant from said eyepiece.

4. In a flicker-photometer, a rotatable disk having frusto-conical reflecting-surfaces the elements of which make an angle of forty-five degrees with the axis of rotation of the disk.

5. A flicker-photometer having a rotatable disk, means for rotating said disk, reflector-surfaces on said disk to reflect light from two different sources, means for reversing said disk to interchange the reflecting-surfaces with respect to the lights, and means for viewing said reflecting-surfaces.

6. A flicker-photometer having a rotatable disk, reflector-surfaces on said disk to reflect light from two different sources, standards for supporting said disk, a sight-tube supported from said standards, and means whereby said standards may be rotated through one hundred and eighty degrees to interchange the reflector-surfaces with respect to the light sources.

7. A flicker-photometer having a rotatable disk, reflector-surfaces on said disk to reflect light from two different sources, standards for supporting said disk, a sight-tube supported from said standards, means whereby said standards may be rotated through one hundred and eighty degrees to interchange the reflector-surfaces with respect to the light sources, and means for rotating the sight-tube through a vertical angle of one hundred and eighty degrees.

8. In a flicker-photometer, a rotatable disk having two reflecting-surfaces on its periphery, each of said surfaces covering substantially half the periphery of the disk and being of substantially uniform width.

9. A flicker-photometer having a base-block, standards pivotally mounted on said block, a rotatable disk carried by said standards, means for rotating said disk, and an eyepiece for viewing said disk.

10. A flicker-photometer having a base-block, standards mounted on said block, a rotatable disk supported by said standards, said disk having angularly-disposed reflecting-surfaces on its periphery, means for rotating said disk, and an eyepiece for viewing said disk.

11. A flicker-photometer having a base-block, standards mounted on said block, a rotatable disk supported by said standards, said disk having a central web and frusto-conical reflecting-surfaces on the periphery of the web, means for rotating said disk, and an eyepiece for viewing said disk.

12. A flicker-photometer having a plurality of light-reflecting surfaces, means for rotating said reflecting-surfaces, and means for successively viewing said surfaces while in motion.

13. A flicker-photometer having a plurality of light-reflecting surfaces, means for continuously moving said surfaces at equal speeds, and means for successively viewing said surfaces while in motion.

In witness whereof I have hereunto set my hand this 19th day of August, 1904.

JOHN THOS. DEMPSTER.

Witnesses:
BENJAMIN B. HULL,
HELEN ORFORD.